(No Model.)

F. COLEMAN.
KITCHEN CABINET.

No. 509,653.  Patented Nov. 28, 1893.

Witnesses
Smith McKean

Inventor
Frederick Coleman.
By his Attorney
W. M. Brown

UNITED STATES PATENT OFFICE.

FREDERICK COLEMAN, OF BINGHAMTON, NEW YORK.

KITCHEN-CABINET.

SPECIFICATION forming part of Letters Patent No. 509,653, dated November 28, 1893.

Application filed May 29, 1893. Serial No. 475,924. (No model.)

*To all whom it may concern:*

Be it known that I, FREDERICK COLEMAN, a citizen of the United States, residing at Binghamton, Broome county, New York, have invented certain new and useful Improvements in Kitchen-Cabinets; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a new and improved kitchen cabinet.

Figure 1:
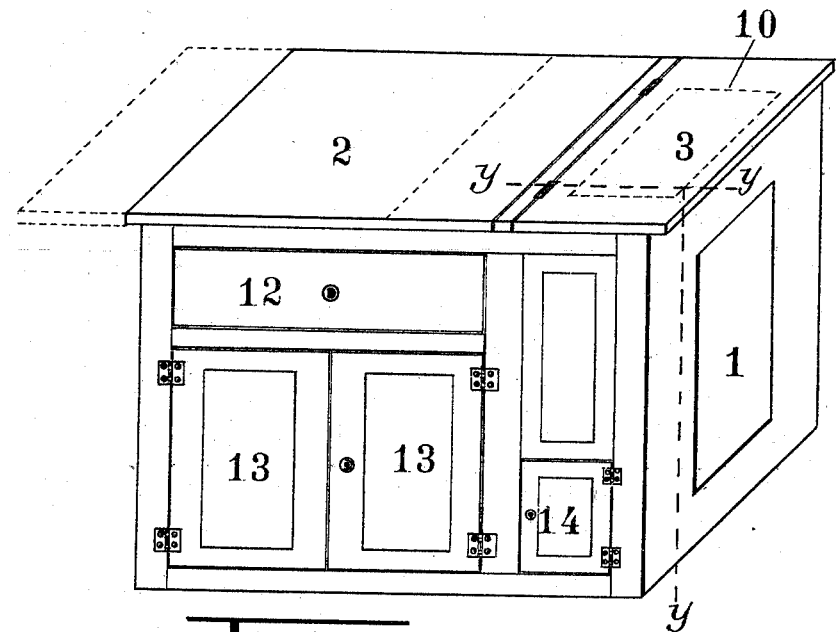
Figure 4:
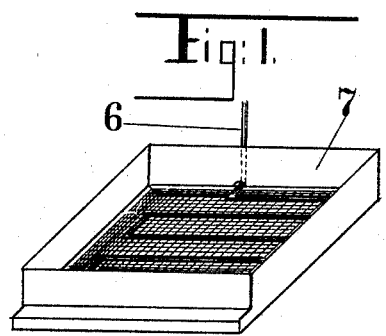
Figure 2:
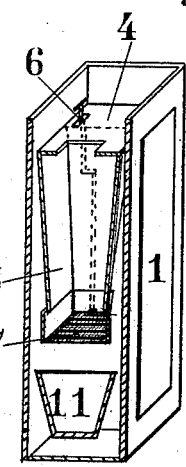
Figure 3:
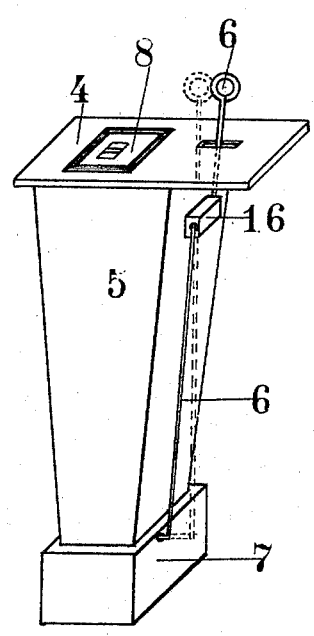

In the drawings Figure 1 shows a perspective view of my cabinet in operative construction; Fig. 2, a vertical section of Fig. 1 taken on lines Y. Y; Fig. 3 a perspective view of my removable flour bin and sifter enlarged; Fig. 4. a perspective view of my sieve and the agitator therein, and Fig. 5 a perspective view of the open top of my cabinet showing the molding board and rolling pin holder.

The numeral 1 refers to the casing of my device which may be in any form desired but I prefer it in the form of a cabinet as shown in Fig. 1. The top of the cabinet is divided preferably, into two divisions, 2 and 3, 2 being a flat sliding board, arranged to slide lengthwise as indicated by the dotted lines, while 3 is a cover, preferably hinged and arranged to rise and fall. On the under side of the cover 3 (indicated by dotted lines 10 in Fig. 1 and shown in plan at 10 in Fig. 5) is permanently fastened, preferably, a raised board 10 for use as a molding or pastry board and at 9 is a strip or cleat forming an open space between the end of the board 10 and cleat 9, for a rolling-pin holder, it being necessary to have some place in which to place the pin so it will not roll about. The rolling pin 15, when the cover 3 is closed preferably lies under the cover as shown in Fig. 5.

The end of the cabinet covered by the cover 3 contains my flour bin and sifter 5 shown in Figs. 2 and 3 which consists of a vertical receptacle, having sloping sides preferably, its lower end being connected with or discharging into a receptacle having a wire cloth bottom or other sieve as shown in Figs. 2 and 4 but the sieve may be a part and portion of the lower end of the bin if desired although I prefer it as shown. Attached to the flour bin preferably, and having a lateral motion is a shaker 6 which ends in the sieve box in the form of a spider as seen in Fig. 4 and arranged so that when the shaker 6 is agitated, the spider will rub over and upon the upper surface of the wire cloth sieve causing all lumps of flour to be broken and passed through the sieve, while the flour so sifted falls into dish 11 which is located back of the small door 14 and is entered and taken therefrom through this door. The lower part or bottom of the sieve, therefore, lies just above the top of the door 14 preferably, leaving room to set dish 11 under it and close the door. The shaker 6 is arranged to have the necessary lateral motion preferably by passing it through the block 16 which is made fast to the side of the bin 5 and making a working fit. The dotted lines at the side of shaker 6 in Fig. 3 show its lateral motion.

Figure 5:
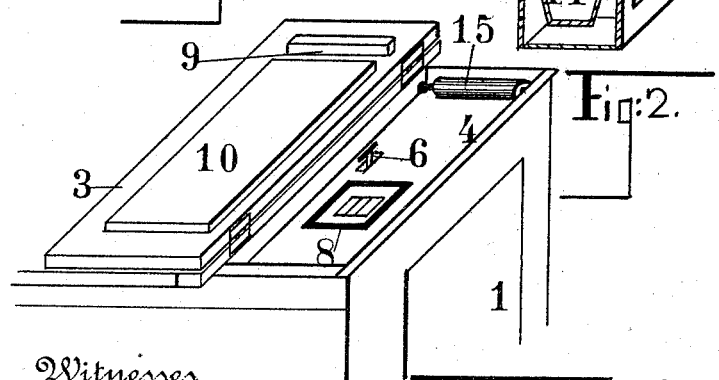

The position of the top of bin 5 when in place in the cabinet is fully seen in Fig. 5, showing it to lie below the top edge of the cabinet and to be covered by the cover 3 and board 10.

In the top of the bin 5 is a cover 8 covering an opening in the top through which opening the flour is introduced into the bin, the handle of the shaker 6 rising through another opening so as to be seized and operated when the cover 3 is raised. The top 4 of bin 5 preferably projects over the rear of the bin in all those cases, like the one herein shown, where the bin does not entirely fill the opening in the cabinet, but it is obvious, that the entire opening in which the bin 5 sets may be occupied by a bin, or be itself the bin if desired, but as I wish to have the bin 5 removable so as to readily make necessary repairs to the sieve, shaker and other parts, I prefer it as shown.

In the cabinet is drawer 12 and it may be divided into compartments if desired for spices, &c., and under the drawer 12 is a cupboard 13 for pots and kettles or such other kitchen furniture as may be stored therein.

The operation is as follows: The cover 3 is raised and cover 8 removed when a sack or other quantity of flour as it comes from the dealer is emptied into bin 5. Flour being wanted for culinary use, the handle 6 is given a sidewise or lateral motion when the spider or grid in the sieve agitates the flour and causes it to pass through the sieve into dish 11, when the dish is removed through door 14 and set on the cover 8 or elsewhere, and the ordinary rolling of dough and other operations of preparing it for food are practiced by means of the rolling pin 15 and board 10. It may be desirable, while preparing for baking, to have more room than the cabinet top would furnish if the top section 2 was stationary and in such case, that section being made to slide lengthwise, it is moved outward, as indicated by the dotted lines in Fig. 1, when the top section 2 thus extended, together with the open cover 3 provide a large space upon which to set desired utensils. Spices, baking powders, &c., being kept in the drawer 12 they are readily reached, while baking pans, kettles and such bulky articles are readily obtained from the cupboard or closet 13.

The rolling pin being a cylindrical implement is constantly rolling about and never stationary when laid down, and to provide against these features, I put the cleat 9 at the end of board 10 and leave a space in which the pin 15 may be laid and when so placed it can not roll about. If the sieve 7 or the shaker 6 or any part of the bin 5 becomes damaged so it need repairs, the bin is lifted out of the cabinet and the repairs readily made, but the bin may be stationary of course but I prefer it removable as shown.

Having fully described my invention, so that any person skilled in the art to which it appertains may make and use the same, what I claim is—

1. A cabinet, in the interior of which is located a flour bin arranged to be removed from and returned to the said interior, and having a sieve and an agitator to agitate the contents thereof said cabinet having an unobstructed top formed in sections, one at least of said sections being arranged to slide or move away from the other, the other section swinging and reversing in the direction of the sliding section, and when the sections are so moved forming together an extension of the top of the cabinet as and for the purposes described.

2. A cabinet having a top formed in sections, one at least of said sections being arranged to slide or move away from the other, the other section swinging and reversing in the direction of the sliding section, and when the sections are so moved forming together an extension of the top of the cabinet as and for the purposes described.

3. A cabinet, in the interior of which is located a removable flour bin having a sieve and flour agitator, the sides of the bin sloping toward the bottom thereof and being wider at top than bottom, said cabinet having a top formed in sections, one or more of which is arranged to slide or move away from the other, such other section swinging and reversing in the direction of the sliding section, forming, when the sections are so moved an extension of the top of the cabinet and having a cover for the flour bin and a cover for the cabinet and a chamber between the covers arranged to hold articles as and for the purposes described.

In testimony whereof I affix my signature in presence of two witnesses.

FREDERICK COLEMAN.

Witnesses:
ELLEN F. COLEMAN,
CHARLES TERK.